United States Patent
Szepek et al.

(10) Patent No.: US 8,712,665 B2
(45) Date of Patent: Apr. 29, 2014

(54) SYSTEMS AND METHODS FOR UNCHOKED CONTROL OF GAS TURBINE FUEL GAS CONTROL VALVES

(75) Inventors: Scott William Szepek, Schenectady, NY (US); Michael John Mariani, Greer, SC (US); Robert Loeven, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 1111 days.

(21) Appl. No.: 12/688,179

(22) Filed: Jan. 15, 2010

(65) Prior Publication Data

US 2011/0130941 A1 Jun. 2, 2011

Related U.S. Application Data

(60) Provisional application No. 61/265,016, filed on Nov. 30, 2009.

(51) Int. Cl.
*G06F 19/00* (2011.01)

(52) U.S. Cl.
USPC ............................ 701/100; 60/772; 60/39.35

(58) Field of Classification Search
USPC .............. 701/99–103; 60/735, 772, 773, 793, 60/39.12, 39.281, 39.34, 39.35; 11/99–103; 123/330–331
See application file for complete search history.

(56) References Cited

U.S. PATENT DOCUMENTS

| | | | | |
|---|---|---|---|---|
| 4,146,051 A * | 3/1979 | Sparks | ........................ | 137/486 |
| 6,795,780 B1 * | 9/2004 | Hyde | .............................. | 702/45 |
| 7,481,061 B2 * | 1/2009 | Gadde et al. | .................... | 60/778 |
| 7,549,293 B2 * | 6/2009 | Gallagher et al. | .............. | 60/773 |
| 7,610,746 B2 * | 11/2009 | Fujii et al. | .................. | 60/39.281 |
| 2002/0082783 A1 * | 6/2002 | Grosshart | ....................... | 702/50 |
| 2004/0031268 A1 * | 2/2004 | Wilkes | ............................ | 60/772 |
| 2007/0089395 A1 * | 4/2007 | Fujii et al. | .................. | 60/39.281 |
| 2007/0101724 A1 * | 5/2007 | Gadde et al. | .................... | 60/773 |
| 2007/0186557 A1 * | 8/2007 | Gallagher et al. | .............. | 60/773 |
| 2007/0283933 A1 * | 12/2007 | Magner et al. | ................ | 123/491 |
| 2009/0241510 A1 * | 10/2009 | Gallagher et al. | ......... | 60/39.281 |
| 2010/0083633 A1 * | 4/2010 | Aiton et al. | ................ | 60/39.463 |
| 2011/0130941 A1 * | 6/2011 | Szepek et al. | ................. | 701/100 |

FOREIGN PATENT DOCUMENTS

JP 10159585 A1 6/1998

* cited by examiner

*Primary Examiner* — Thomas Black
*Assistant Examiner* — Ce Li
(74) *Attorney, Agent, or Firm* — Sutherland Asbill & Brennan LLP

(57) ABSTRACT

Certain embodiments of the invention may include systems and methods for providing unchoked control of gas turbine fuel control valves. According to an exemplary embodiment of the invention, a method is provided for active control of a gas flow control valve. The method may include receiving a desired fuel command and an inlet pressure parameter, and determining a gas flow gain based at least in part on the inlet pressure parameter. The method may also include determining a valve flow coefficient based at least in part on the desired fuel command and the gas flow gain, and controlling the gas flow control valve based at least in part on the valve flow coefficient.

20 Claims, 3 Drawing Sheets

SYSTEMS AND METHODS FOR UNCHOKED CONTROL OF GAS TURBINE FUEL GAS CONTROL VALVES

CROSS-REFERENCE TO RELATED APPLICATION

This application claims benefit of U.S. Provisional Application No. 61/265,016, filed Nov. 30, 2009, which is incorporated herein by reference.

FIELD OF THE INVENTION

This invention generally relates to gas turbines, and more specifically to systems and methods for unchoked control of gas turbine fuel control valves.

BACKGROUND OF THE INVENTION

Gas turbines and other fuel consuming machines typically convert fuel energy into work, and the work may be used to drive an electrical generator, for example. The amount of work produced is dependent upon the fuel consumption rate and control valves are typically utilized to set the rate of fuel delivery to the combustion portion of the machine. For example, a gas flow control valve may be electronically or manually controlled to increase or decrease the fuel flow rate to a combustor in an attempt to meet the load demand of the machine. Under certain conditions, however, the fuel throughput may be limited, and thus the work throughput of the machine may be limited. For example, the turbine fuel supply system pressure may drop requiring a gas flow control valve to open significantly to satisfy the flow rate demand. In this mode of operation, the gas flow control valve may operate in an "un-choked" state, meaning that the fuel delivery rate is sensitive to changes in upstream fuel supply pressure as well as downstream valve outlet conditions. Conventional turbine systems typically operate in a "choked" state because downstream pressure changes due to changes in turbine cycle conditions, or changes in combustor pressure for example, can cause corresponding fuel rate spikes or oscillations. This method of operation is desirable for disturbance rejection so that transients in the upstream (fuel source) pressure and downstream (combustor) pressure cannot interrupt the steady flow of fuel to the turbine.

Conventional gas turbine fuel control systems require a relatively high pressure gas fuel source so that the flow control valves may operate in the choked state. Typically, this fuel source will be at a much higher pressure than is required for the fuel metering system, and an additional pressure-regulating valve is often utilized to regulate the pressure to the gas flow control valve(s) to a desired set point. Typically, this pressure set point is high enough so that the gas flow control valve(s) will always operate choked.

The problem, however, is that sometimes the fuel source is at an insufficient pressure to choke the gas control valves at all load points, even if the pressure-regulating valve is opened fully to minimize pressure drop through the system. Therefore, a need remains for improved systems and methods for unchoked control of gas turbine fuel control valves.

BRIEF SUMMARY OF THE INVENTION

Some or all of the above needs may be addressed by certain embodiments of the invention. Certain embodiments of the invention may include systems and methods for unchoked control of gas turbine fuel control valves According to an exemplary embodiment of the invention, a method is provided for active control of a gas flow control valve. The method may include receiving a desired fuel command and an inlet pressure parameter, determining a gas flow gain based at least in part on the inlet pressure parameter, determining a valve flow coefficient based at least in part on the desired fuel command and the gas flow gain, and controlling the gas flow control valve based at least in part on the valve flow coefficient.

According to an exemplary embodiment of the invention, another method is provided for active control of a gas flow control valve. The method may include receiving a desired fuel command and an inlet pressure parameter, determining a choked valve flow factor and an unchoked valve flow factor of the gas flow control valve based at least in part on the inlet pressure parameter. The method may include determining a gas flow gain based at least in part on the choked valve flow factor and the unchoked valve flow factor or the inlet pressure parameter. The method may also include determining a valve flow coefficient based at least in part on the desired fuel command and the gas flow gain, and controlling the gas flow control valve based at least in part on the valve flow coefficient.

According to another exemplary embodiment, a system is provided for active control of a gas flow control valve. The system may include a gas turbine combustor, one or more gas flow control valves coupled with the combustor and a controller including one or more processors. The one or more processors are operable to receive a desired fuel command and an inlet pressure parameter, determine a gas flow gain based at least in part on the inlet pressure parameter, determine a valve flow coefficient based at least in part on the desired fuel command and the gas flow gain, and control the gas flow control valve based at least in part on the valve flow coefficient.

According to another exemplary embodiment, a controller is provided for active control of a gas flow control valve. The controller may include one or more processors. The one or more processors are operable to receive a desired fuel command and an inlet pressure parameter, determine a gas flow gain based at least in part on the inlet pressure parameter, determine a valve flow coefficient based at least in part on the desired fuel command and the gas flow gain, and control the gas flow control valve based at least in part on the valve flow coefficient.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. The term "exemplary" as used throughout this document is defined to mean "example."

Exemplary embodiments of the invention may allow stable and accurate fuel flow to a gas turbine, even when upstream fuel pressure is insufficient to allow the gas valves to be choked. Certain embodiments of the invention may allow the gas turbine to accurately meter fuel and maintain a steady load on the gas turbine regardless of whether the gas flow control valves are choked or unchoked. Certain embodiments of the invention allow the gas valves to be unchoked to provide a sufficient amount of fuel to maintain a desired turbine operating point. According to exemplary embodiments of the invention, the transition from choked to unchoked flow control (and vice versa) may be seamless.

According to exemplary embodiments of the invention, various algorithms, sensors, and controls are provided for enabling choked or unchoked gas flow control valve operation in a gas turbine. These algorithms, sensors, and controls will now be described with reference to the accompanying figures.

Figure 1:
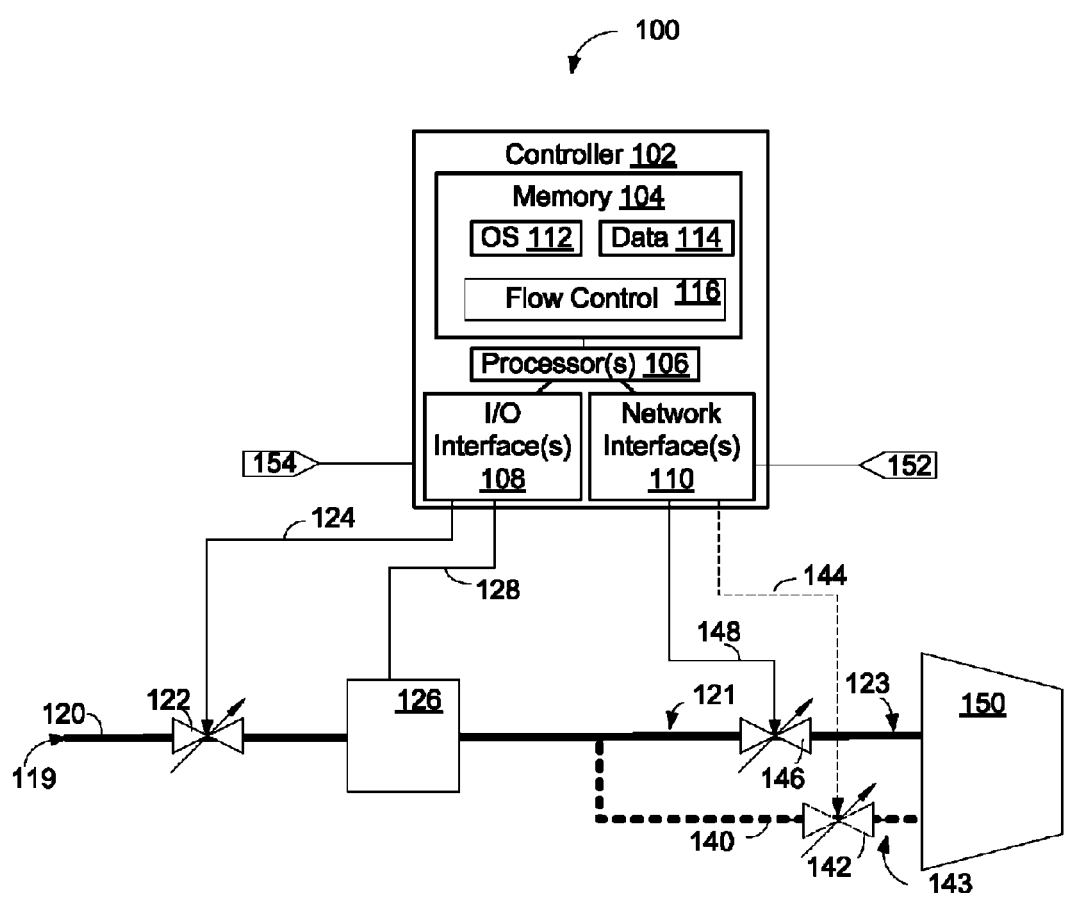
FIG. 1 is a block diagram of an illustrative flow control system, according to an exemplary embodiment of the invention.

FIG. 1 illustrates an exemplary gas flow control system 100 that may be utilized to control one or more gas flow control valves 146. According to exemplary embodiments of the invention, the gas flow control system 100 may include a controller 102, a memory 104, one or more processors 106, input/output (I/O) interfaces 108 and one or more network interfaces 110. The memory 104 may include an operating system (OS) 112, data 114, and one or more flow control modules 116. According to certain exemplary embodiments, the flow control modules 116 may be in communication with the one or more processors 106 and may be utilized in determining various system 100 flow parameters, based on various system inputs 152, 154 sensor measurement values 128, 132, and stored data 114.

According to exemplary embodiments of the invention, the I/O interfaces 108 and/or the network interfaces 110 may receive control inputs for communication to the processors 106 and the flow control modules 116. The I/O interfaces 108 and/or the network interfaces 110 may also provide signals 124 for controlling the pressure valve(s) 122, and signals 144, 148 for controlling the control valve(s) 142, 146 in the system 100, as will be described below.

According to exemplary embodiments of the invention, gas fuel for use in a turbine combustor 150 may be supplied by a fuel line 120. The fuel line 120 may have an upstream fuel line portion 119, a midstream fuel line portion 121, and a downstream fuel line portion 123. According to an exemplary embodiment of the invention, the fuel pressure in the midstream fuel line portion 121 of the fuel line 120 may be controlled, at least in part, by a pressure valve 122. According to an exemplary embodiment of the invention, the fuel pressure and/or fuel flow rate in the downstream fuel line portion 123 may be controlled, at least in part, by a gas flow control valve 146. In certain exemplary embodiments, one or more additional gas flow control valve(s) 142, each with individually controllable fuel flow rates, may be utilized to provide additional fuel flow to additional downstream fuel line portions 123. In this embodiment, the fuel delivered and distributed among various combustor fuel nozzles may be individually controlled via flow valve control signals 144, 148.

According to exemplary embodiments of the invention, the controller 102 may be operable to continuously receive sensor, measurement, and/or external control signals 128, 152, 154, and the controller 102 may be operable to compute and transmit control signals 124, 144, 148 to the various valves 122, 142, 146. For example, the pressure valve 122 may receive pressure valve control signals 124 from the controller 102 (or alternatively from an external control source) to provide a fuel pressure drop in the fuel line 120 from the upstream fuel line portion 119 to the midstream fuel line portion 121.

According to certain exemplary embodiments of the invention, one or more sensors 126 may be utilized to monitor any number of parameters associated with the fuel, including pressure, temperature, flow rate, specific heat, specific gravity, fuel compressibility, etc. The sensor signals 128 may be communicated to the controller 102 via the I/O interfaces 108 or the network interfaces 110 for processing, and for inputs to the flow control module 116. According to exemplary embodiments, the sensors 126 may be placed at any suitable location(s) in the gas flow control system to measure and/or monitor the various fuel-related parameters. For example, sensors for measuring pressure, temperature, flow rate, specific heat, specific gravity, fuel compressibility, etc. may be located for sensing parameters in the upstream fuel line portion, 119, the midstream fuel line portion 121, and/or the downstream fuel line portion 123 of the fuel line 120.

According to exemplary embodiments of the invention, the controller may process the received sensor signals 128, for example via the flow control module 116, and may provide one or more control signals 124, 144, 148 for controlling the flow of fuel to the turbine 150. In an exemplary embodiment, the controller may provide a pressure valve control signal 124 for controlling the pressure valve 122, and thereby, provide control of the pressure drop from the upstream fuel line portion 119 to the midstream fuel line portion 121. In an exemplary embodiment, the controller may provide a flow valve control signal 148 for controlling the gas flow control valve 146, thereby controlling the flow of fuel to the turbine 150. In exemplary embodiments, an external command 154 may be received by the controller 102 and utilized for input in the flow control module 116. According to an exemplary embodiment, a load signal 152 may be received by controller 102 and utilized as a set point for commanding fuel to the turbine 150.

In accordance with other exemplary embodiments of the invention, the flow control module 116 may include a split function that may be utilized in conjunction with the gas flow control system 100 to provide individually tailored gas flow through additional gas flow control valves 142 in response to additional flow valve control signals 144 provided by the controller 102. In these multi-valve embodiments, the fuel flow can be individually and dynamically controlled through each gas flow control valves 142, 146, for example, to distribute the fuel in specified patterns among the combustor 150 fuel nozzles, or to provide additional fuel throughput. Further details with regard to various controller 102 inputs and outputs, and the split function will be presented below in the description of FIG. 2.

Figure 2:
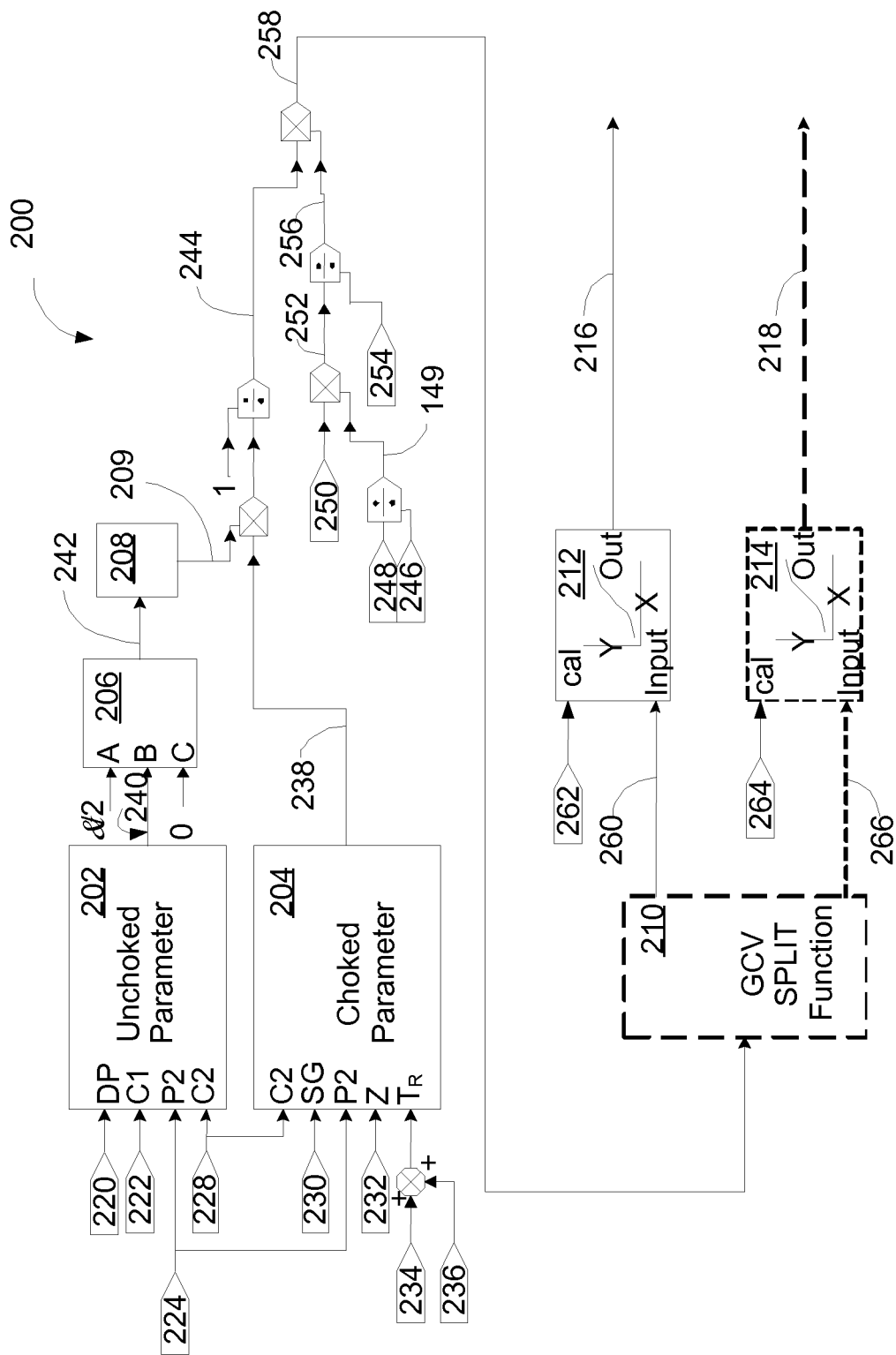
FIG. 2 is a block diagram of an illustrative gas flow valve control algorithm according to an exemplary embodiment of the invention.

FIG. 2 depicts a block diagram of an illustrative gas flow valve control algorithm 200 according to an exemplary embodiment of the invention. The algorithm 200 may be associated with the flow control module 116 of FIG. 1. In accordance with exemplary embodiments of the invention, the algorithm 200 may produce a valve flow coefficient 258 for controlling one or more gas control valves in response to various parameters and measurements. According to exemplary embodiments of the invention, the algorithm 200 may involve a series of calculations that can be used to actively control gas control valves (single, or multiples in parallel) to accurately meter fuel even when the gas control valves are operating unchoked.

In an exemplary embodiment, a desired gas turbine combustor energy flow rate 252 (e.g., BTU/sec) may be determined. The energy flow rate 252 may be based on a desired turbine load fuel command signal, also known as a fuel stroke reference (FSR) 250, which may be automatically determined by the controller 102 or selected by an operator. This value is generally represented as a percentage. In an exemplary embodiment, the desired FSR 250 may be multiplied by a fuel energy per unit time of command (e.g., BTU/sec/%), which may represent how much energy is required per unit of turbine load signal, or how much energy is present per unit of FSR 250. Multiplying the fuel energy per unit time of command 248 by the FSR 250 may provide an energy flow rate 252 (e.g., BTU/sec), which may represent the demand that is required for the turbine to reach the selected load.

In an exemplary embodiment, another calculation may be made to convert the previous energy flow rate 252 fuel command into a desired fuel flow rate 256 (e.g., LB/sec). The energy flow rate 252 may be divided by a gas energy per mass parameter 254 (e.g., BTU/LB), which may be a constant if the fuel source is very consistent, or may be provided from a sensor reading, for example, from a high-speed calorimeter or chromatograph to compensate for changes in the fuel energy content. The output of this calculation is a desired fuel flow rate 256 (e.g., LB/sec) to the combustor. For some applications, the energy per mass parameter 254 (e.g., BTU/LB) may be manipulated intentionally and is intended to change.

In an exemplary embodiment, another calculation may be made involving the universal valve flow equation via the choked parameter module 204. The universal valve flow equation can be represented as:

$$B \cdot C_2 \cdot P_2 \sqrt{\frac{SG}{T_R Z}},$$

where, according to an exemplary embodiment, the choked parameter B may be predefined or otherwise adjusted as necessary. In an exemplary embodiment, B may be set to $4.83 \times 10^{-4}$. The other input variables to this equation may be defined as follows: SG=fuel specific gravity parameter 230, Z=fuel compressibility parameter 232, $P_2$=inlet pressure parameter 224, $T_R$=fuel temperature 234 (modified by rankine conversion 236), $C_2$=specific heat ratio correction factor 228. These inputs can be assumed or measured. The output of the choked parameter module 204 is the choked valve flow gain 238 (e.g., CG/LB/sec).

In accordance with exemplary embodiments of the invention, the choked valve flow gain 238 can be used to determine how much the gas flow control valve 146 needs to be open to flow a certain amount of fuel by mass per unit time (e.g., CG/LB)/sec). Note that the output of this calculation will be the desired flow if the valves were choked.

In an exemplary embodiment, another calculation may be made to determine if the valve is unchoked or not, and the extent to which the valve is unchoked. In accordance with an exemplary embodiment, the unchoked flow parameter of the universal valve flow equation may be calculated in the unchoked parameter module 202. This version of the universal valve flow equation can be represented as:

$$\frac{\pi}{180} \frac{A}{C_1 C_2} \sqrt{\frac{DP}{P_2}},$$

where, according to an exemplary embodiment, the unchoked flow parameter A may be settable. In an exemplary embodiment, the unchoked flow parameter A may be set at approximately 3417. The other input variables to this equation may be defined as follows: DP=gas control valve differential pressure 220, $P_2$=inlet pressure parameter 224, $C_2$=specific heat ratio correction factor 228, and $C_1$=valve recovery factor 222. The output of the unchoked parameter module 202 is the unchoked valve factor 240.

In an exemplary embodiment, another calculation may be made by taking the sine value 208 of the median unchoked parameter 242, and multiplying the result 209 by the previously calculated choked valve flow gain 238. The median unchoked parameter 242 may be clamped between 1 and 0 via a constraining block 206. For example, a value of 1 may represent a choked valve, whose flow would not vary with downstream pressure. The resulting median unchoked parameter 242 may then be multiplied by the choked valve flow gain 238 to produce an unchoked flow per control gas valve value. This value may then be inverted to produce gas flow gain 244 (e.g., CG/LB/sec).

In accordance with exemplary embodiments of the invention, the gas flow gain 244 may be multiplied by the desired fuel flow rate 256 (e.g., LB/sec) determined previously. Multiplying these two values together may yield the required total valve flow control (coefficient) 258 for controlling desired fuel flow. In certain embodiments, this total valve flow control 258 may also be known as the CG.

In accordance with certain embodiments of the invention, the next portion of the gas flow valve control algorithm 200 may depend on how many gas control valves 142, 146, are present in the system. If only one valve 146 is present, then the total valve flow control 258 may be the desired gas control value of that valve. However, if two or more valves 142, 146, are present, the total valve flow control 258 may be split among these valves 142, 146 using a gas control valve split function 210. Exemplary embodiments of the gas control valve split function 210 may enable, for example, holding one valve at a constant low flow value while the other valve is opened all the way, at which point, the first valve may then be released to continue opening. Another exemplary embodiment may include opening all valves to an equal amount. Still other complicated systems may utilize the gas control valve split function 210 to split the total valve flow control 258 to each valve such that each valve may be dynamically altered to reflect changing turbine conditions depending on the needs of the specific turbine, for example, combustor stability or emissions control. Regardless of the specific implementation, this portion of the algorithm may assign a desired control value N 260, 266 to each gas control valve 142, 146.

In an exemplary embodiment of the invention, lookup tables 262, 264 may be used to compute the gas valve control position commands 216, 218 to each gas control valve 142, 146 in order to determine what stroke to open each gas control valve 142, 146. It is assumed that the gas control valves 142, 146 will have been flow tested (or that a representative table has been provided by the manufacturer), which may allow a simple 1-d interpolation 212, 214 to determine valve stroke based on the desired control value N 260, 266 for each valve.

In accordance with exemplary embodiments, the gas flow control algorithm may be fully implemented many times per second in order to accurately and continuously deliver a desired amount of fuel to reach a desired load in a gas turbine where the gas control valves may be choked or unchoked.

Figure 3:
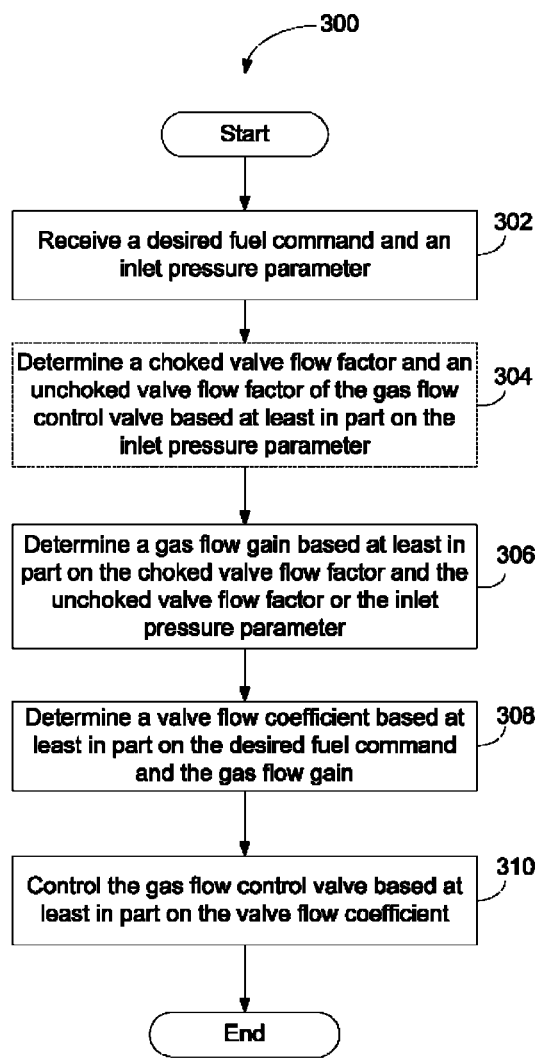
FIG. 3 is a flow diagram of an exemplary method according to an exemplary embodiment of the invention.

An exemplary method 300 for active control of a gas flow control valve 146 will now be described with reference to the flowchart of FIG. 3. In block 302 and according to an exemplary embodiment of the invention, a desired fuel command FSR 250 and an inlet pressure parameter 224 may be received. According to an optional embodiment of the invention, and as depicted in optional block 304, a choked valve flow factor 238 and an unchoked valve flow factor 240 of the gas flow control valve 146 may be determined based at least in part on the inlet pressure parameter 224. In block 306, and according to an exemplary embodiment of the invention, a gas flow gain 244 may be determined based at least in part on the inlet pressure parameter 224, or on the choked valve flow factor 238 and the unchoked valve flow factor 240, as determined in optional block 304. In block 308, and according to an exemplary embodiment, a valve flow coefficient 258 may be determined based at least in part on the desired fuel command FSR 250 and the gas flow gain 244. And in block 310, according to an exemplary embodiment, the gas flow control valve 146 may be controlled based at least in part on the valve flow coefficient 258.

Accordingly, exemplary embodiments of the invention can provide the technical effects of creating certain systems and methods that can provide for higher loading and operation of a gas turbine under low pressure fuel supply conditions. For example, embodiments of the invention may allow a fuel supply system to be designed with a low fuel supply pressure in mind, or it could be used for a normal high pressure system which is experiencing a low pressure fuel supply due to some type of system failure.

In addition, exemplary embodiments of the invention can provide the technical effects of creating certain systems and methods that can provide for reduction in size (or elimination of) a fuel gas compressor (FGC). For example, in installations that use a fuel gas compressor to pressurize the fuel supply, it may be possible through the use of the invention, to use a smaller gas compressor, which may significantly reduce the price and size of the gas compressor. Also, depending on the gas pressure supplied from a plant's pipeline, it may allow a site which would normally require a FGC to eliminate the FGC altogether from the design. This could significantly reduce the cost and design complexity of such a system.

Accordingly, exemplary embodiments of the invention can also provide the technical effects of creating certain systems and methods that can improve efficiency. For example, the smaller gas compressor has a further aspect in that the smaller compressor will be significantly more efficient. This is because the gas compressor consumes energy in order to pressurize the fuel. Since a fuel system which utilizes the invention can operate with a lower fuel supply pressure, the gas compressor will pressurize to a lower pressure and therefore consume less energy. This energy savings can be as high as several megawatts, and can be a continuous energy savings at all times during the operation of the unit.

Accordingly, exemplary embodiments of the invention can also provide the technical effects of creating certain systems and methods that can lead to relatively cheaper gas control valve (GCV) design. For example, it may be possible to eliminate the use of expensive high-recovery GCVs for some systems. These expensive valves are designed to allow a lower fuel source pressure without allowing the valves to go unchoked. The use of the invention's control system could allow the purchase of cheaper normal valves for such systems, which could then be operated unchoked.

Also, exemplary embodiments of the invention can also provide the technical effects of creating certain systems and methods that can tolerate a simpler gas control valve design. For example, unchoked valves generally have a much higher flow capacity than choked valves. For very high fuel flow systems, use of the invention's control system may enable a fuel system to be designed with fewer gas control valves in parallel, thus reducing the complexity and cost of the system.

In exemplary embodiments of the invention, the gas flow control system 100 and the gas flow valve control algorithm 200 may include any number of software applications that are executed to facilitate any of the operations.

In exemplary embodiments, one or more I/O interfaces may facilitate communication between the gas flow control system 100 and the gas flow valve control algorithm 200, and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the gas flow control system 100 and the gas flow valve control algorithm 200. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the gas flow control system 100 and the gas flow valve control algorithm 200 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network, any wired network, any wireless network, etc., for communication with external devices and/or systems.

As desired, embodiments of the invention may include the gas flow control system 100 and the gas flow valve control algorithm 200 with more or less of the blocks or components illustrated in FIGS. 1 and 2.

The invention is described above with reference to block and flow diagrams of systems, methods, apparatuses, and/or computer program products according to exemplary embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method, comprising executing computer executable instructions by one or more processors for control of a gas flow control valve, the method further comprising:
   receiving a desired fuel command and an inlet pressure parameter;
   determining a choked valve flow factor and an unchoked valve flow factor, both the choked valve flow factor and the unchoked valve flow factor based at least in part on the inlet pressure parameter;
   determining a gas flow gain based at least in part on either the choked valve flow factor and the unchoked valve flow factor, wherein determining the gas flow gain further comprises inverting the product of the choked valve flow factor and an unchoked multiplier;
   determining a valve flow coefficient based at least in part on the desired fuel command and the gas flow gain; and
   controlling the gas flow control valve based at least in part on the valve flow coefficient.

2. The method of claim 1, wherein determining the choked valve flow factor is further based on one or more of: a fuel specific gravity, a fuel compressibility parameter, a fuel temperature, or a fuel specific heat ratio correction factor.

3. The method of claim 1, wherein determining the unchoked valve flow factor is further based on one or more of: a gas control valve differential pressure, a fuel temperature, a fuel specific heat ratio correction factor, or a valve recovery factor.

4. The method of claim 1, further comprising controlling a plurality of gas flow control valves based at least in part on a gas control valve split function and one or more gas control valve position commands wherein the total valve flow gain is selectively split to control the individual gas flow control valves.

5. The method of claim 4, wherein the one or more gas flow control valve position commands is based at least in part on a valve stroke per valve gain lookup table.

6. The method of claim 1, wherein determining a valve flow coefficient is further based on one or more of: a gas energy per mass parameter or an energy required per unit of turbine load parameter.

7. The method of claim 1, wherein the unchoked multiplier is based at least in part on the unchoked valve flow factor and is clamped between one and zero.

8. A system comprising:
   a gas turbine combustor;
   one or more gas flow control valves coupled with the combustor; and
   a controller comprising one or more processors operable to:
     receive a desired fuel command and an inlet pressure parameter;
     determine a choked valve flow factor and an unchoked valve flow factor, both the choked valve flow factor and the unchoked valve flow factor based at least in part on the inlet pressure parameter;
     determine a gas flow gain based at least in part on either the choked valve flow factor and the unchoked valve flow factor, wherein determining the gas flow gain further comprises inverting the product of the choked valve flow factor and an unchoked multiplier;
     determine a valve flow coefficient based at least in part on the desired fuel command and the gas flow gain; and
     control the gas flow control valve based at least in part on the valve flow coefficient.

9. The system of claim 8, wherein the choked valve flow factor is further based on one or more of a fuel specific gravity, a fuel compressibility parameter, a fuel temperature, or a fuel specific heat ratio correction factor.

10. The system of claim 8, wherein the unchoked valve flow factor is further based on one or more of: a gas control valve differential pressure, a fuel temperature, a fuel specific heat ratio correction factor, or a valve recovery factor.

11. The system of claim 8, wherein the one or more processors is further operable to control a plurality of gas flow control valves based at least in part on a gas control valve split function and one or more gas control valve position commands wherein the total valve flow gain is split to control the individual gas flow control valves.

12. The system of claim 11, wherein the one or more gas control valve position commands is based at least in part on a valve stroke per valve gain lookup table.

13. The system of claim 8, wherein the valve flow coefficient is further based on one or more of: a gas energy per mass parameter or an energy required per unit of turbine load parameter.

14. The system of claim 8, wherein the unchoked multiplier is based at least in part on the unchoked valve flow factor and is clamped between one and zero.

15. A controller comprising one or more processors operable to:
receive a desired fuel command and an inlet pressure parameter;
determine a choked valve flow factor and an unchoked valve flow factor, both the choked valve flow factor and the unchoked valve flow factor based at least in part on the inlet pressure parameter;
determine a gas flow gain based at least in part on either the choked valve flow factor and the unchoked valve flow factor, wherein the gas flow gain comprises inverting the product of the choked valve flow factor and an unchoked multiplier;
determine a valve flow coefficient based at least in part on the desired fuel command and the gas flow gain; and
control the gas flow control valve based at least in part on the valve flow coefficient.

16. The controller of claim 15, wherein the choked valve flow factor is further based on one or more of: a fuel specific gravity, a fuel compressibility parameter, a fuel temperature, or a fuel specific heat ratio correction factor.

17. The controller of claim 15, wherein the unchoked valve flow factor is further based on one or more of: a gas control valve differential pressure, a fuel temperature, a fuel specific heat ratio correction factor, or a valve recovery factor.

18. The controller of claim 15, wherein the one or more processors is further operable to control a plurality of gas flow control valves based at least in part on a gas control valve split function and one or more gas control valve position commands wherein the total valve flow gain is split to control the individual gas flow control valves.

19. The controller of claim 18, wherein the one or more gas control valve position commands is based at least in part on a valve stroke per valve gain lookup table.

20. The controller of claim 15 wherein the valve flow coefficient is further based on one or more of: a gas energy per mass parameter or an energy required per unit of turbine load parameter.

* * * * *